United States Patent [19]
Grindstaff et al.

[11] 3,864,506
[45] Feb. 4, 1975

[54] PROCESS FOR PRETREATING RAW CHEESE WHEY

[75] Inventors: Donald A. Grindstaff, Minnetonka, Minn.; William P. Ahern, Visalia, Calif.

[73] Assignee: Stauffer Chemical Company, Westport, Conn.

[22] Filed: Mar. 20, 1974

[21] Appl. No.: 452,878

[52] U.S. Cl. .................. 426/356, 426/186, 426/364
[51] Int. Cl. ............................................. A23c 21/00
[58] Field of Search ........... 426/150, 185, 186, 356, 426/360, 364, 381, 417, 491

[56] References Cited
UNITED STATES PATENTS
2,826,571   3/1958   Henika et al. .................. 426/185 X
3,560,219   2/1971   Attebery ............................ 426/417

*Primary Examiner*—Raymond N. Jones
*Assistant Examiner*—R. A. Yoncoskie

[57] ABSTRACT

A process for pretreating a raw cheese whey which comprises forming a phosphate-treated solution of raw cheese whey by admixing raw cheese whey containing at least 70 percent sweet cheese whey with an alkali metal phosphate at a pH from about 5.5 to about 4.0, adjusting the pH of the phosphate-treated solution to a range of from about 6.5 to about 8.0 by the addition of base to form a precipitate and a pretreated cheese whey, separating the precipitate from the pretreated cheese whey and recovering the precipitate and the pretreated cheese whey. This process is particularly effective in removing solubilized lipid and membrane clogging components normally found in the raw cheese whey.

6 Claims, No Drawings

PROCESS FOR PRETREATING RAW CHEESE WHEY

BACKGROUND OF THE INVENTION

This invention relates to a process for pretreating raw cheese whey containing at least 70 percent sweet cheese whey, and more particularly to sweet cheese whey of the types known as cheddar cheese whey, Swiss cheese whey, mozzarella cheese whey, and mixtures thereof. The process of the present invention provides a pretreated cheese whey feed which is more easily processed by molecular separation methods, as for example by gel filtration, ultrafiltration, and/or reverse osmosis.

It is desirable to process raw cheese whey by molecular separation methods to separate protein from lactose and minerals normally contained in the raw cheese whey. The molecular separation methods use semipermeable materials to selectively separate the high molecular weight constituents, i.e., proteins, from the low molecular weight constituents, i.e., lactose and salts. For example, the molecular separation method known as gel filtration can be used in accordance with U.S. Pat. No. Re. 27,806 to separate cheese whey protein from lactose and minerals to yield a whey protein concentrate suitable for use in the protein fortification of food products. It is also known that molecular separation methods, as for example ultrafiltration and/or reverse osmosis, can be used to separate protein from lactose and minerals normally contained in the raw cheese whey. The ultrafiltration and/or reverse osmosis treatment of the raw cheese whey yields a whey protein concentrate suitable for use in the protein fortification of food products.

However, it has been discovered that the molecular separation methods require cheese whey essentially free from components which cause clogging of the semipermeable material or other undesirable processing problems. It is desirable to pretreat raw cheese whey to separate and remove components which cause clogging.

With respect to the pretreatment of cheese whey, it is known that undissolved solids, normally contained in raw cheese whey, can be removed by centrifugal clarification or filtration methods. However, the pretreatment of raw cheese whey for the removal of undissolved solids by centrifugal clarification or filtration is not effective in terms of removing undesirable dissolved solids which cause subsequent clogging.

Other cheese whey pretreatment methods have been directed to the removal of undesirable dissolved cheese whey constituents by chemically complexing the undesirable dissolved constituents. In particular, U.S. Pat. No. 3,560,219 teaches that solubilized lipid can be separated and removed from raw cheese whey by raising the divalent metal ion concentration of the raw cheese whey and then adjusting the pH to between 6 and 8.5 thereby forming a lipid containing precipitate which is separated from the cheese whey. The process is not satisfactory because the divalent metal ion concentration varies according to the type of cheese whey being treated, and even within the same type of cheese whey. Therefore, it is difficult to adjust the divalent metal ion concentration to an optimum level to obtain consistent pretreatment results.

Another problem encountered with cheese whey processing is the formation in the cheese whey during subsequent processing of a secondary sludge after the initial insoluble and/or undesirable dissolved solids are removed by cheese whey pretreatment. It has been found that cheese whey can be effectively clarified to remove initial insoluble solids present in the whey only to have additional insoluble solids, i.e., secondary sludge, form in the cheese whey during subsequent processing. The secondary sludge formation presents a greater problem than the initial insoluble solids present in the cheese whey because the secondary sludge forms at indeterminate times.

One object of the present invention is to provide a pretreated cheese whey having a reduced tendency to clog semipermeable materials used during subsequent processing.

A further object of the present invention is to provide a pretreated cheese whey exhibiting reduced tendency to form secondary sludge during subsequent processing.

SUMMARY OF THE INVENTION

In accordance with the present invention, there is provided a process for pretreating a raw cheese whey, which comprises forming a phosphate treated solution of raw cheese whey by admixing raw cheese whey containing at least 70 percent (weight basis) sweet cheese whey with an alkali metal phosphate selected from the group consisting of potassium acid pyrophosphate, sodium acid pyrophosphate, potassium tripolyphosphate, sodium tripolyphosphate, tetrasodium pyrophosphate, tetrapotassium pyrophosphate, and mixtures thereof at a concentration from about 0.6 gram per liter to about 2.0 grams per liter at a pH from about 5.5 to about 4.0 adjusting the pH of the phosphate-treated solution to a range from about 6.5 to about 8.0 by the addition of a base to form a percipitate and a pretreated cheese whey; and separating the precipitate from the pretreated cheese whey.

The precipitate can be used as a substitute for non-fat milk solids in food products.

The pretreated cheese whey can be further processed, for example, by molecular separation methods to separate and recover the protein from the lactose and minerals normally contained therein. It has been found that pretreatment of cheese whey in accordance with the process of the present invention provides cheese whey having substantially improved processing characteristics in that clogging is substantially reduced.

DETAILED DESCRIPTION OF THE INVENTION

The term raw cheese whey is meant to include 100 percent raw sweet cheese whey or blends of raw sweet cheese whey and raw acid cheese whey containing at least 70 percent sweet cheese whey. By sweet cheese whey is meant cheese whey obtained from cheese produced by the enzymatic coagulation of milk, as for example, by proteolytic enzyme addition to milk normally used in preparing cheddar cheese. More particularly, raw sweet cheese whey is meant to include cheese whey selected from the group consisting of cheddar cheese whey, Swiss cheese whey, mozzarella cheese whey, and mixtures thereof. The term raw acid cheese whey is meant herein raw cheese whey obtained by the acidification of milk, either by direct acidification as in the production of casein whey, or indirect acidification as in the production of cottage cheese whey.

In accordance with the process of the present invention a phosphate-treated solution of raw cheese whey is formed by admixing raw cheese whey with an alkali metal phosphate at a pH from about 5.5 to about 4.0. The term alkali metal phosphate is meant to include alkali metal phosphates selected from the group consisting of potassium acid pyrophosphate, sodium acid pyrophosphate, potassium tripolyphosphate, sodium tripolyphosphate, tetrasodium pyrophosphate, tetrapotassium pyrophosphate, and mixtures thereof. The alkali metal phosphate is added to the raw cheese whey at a concentration from about 0.6 grams per liter to about 2.0 grams per liter. Preferably, the alkali metal phosphate is added to the raw cheese whey at a concentration within the range from about 0.8 grams per liter to about 1.2 grams per liter.

The pH of the phosphate-treated solution is required to be in the range of from about 5.5 to about 4.0. The alkali metal phosphate can be added to the cheese whey at a pH outside the range mentioned above so long as the pH is subsequently adjusted to within the range mentioned above. For example, the original pH of the raw cheese whey can be about 6.0 and the alkali metal phosphate added and then the pH adjusted to the range of from about 5.5 to about 4.0 by acid addition to form the phosphate-treated solution. Alternatively, an acid can be added to the raw cheese whey, to adjust the pH to the range of from about 5.5 to about 4.0 and then the alkali metal phosphate added in accordance with the present invention to form the phosphate-treated solution. Lastly, blends of raw sweet cheese whey and raw acid cheese whey could be used to achieve the pH in the range of from about 5.5 to about 4.0.

The term acid as used herein is meant to include any food grade organic or mineral acid capable of adjusting the pH of the phosphate-treated solution to within the acid range, as for example, mineral acids including hydrochloric acid, sulfuric acid, phosphoric acid and the like; or organic acids including lactic acid, acetic acid, citric acid, and the like.

In accordance with the process of the present invention the pH of the phosphate-treated solution is adjusted to a range of from about 6.5 to about 8.5 by the addition of base. Preferably, the phosphate-treated solution is adjusted to a range of from about 7.0 to about 8.0 by the addition of a base. By the term base it is meant herein any food grade alkaline reacting substance capable of adjusting the pH of the phosphate-treated solution to a pH within the range, as for example, sodium hydroxide, sodium carbonate, potassium hydroxide, potassium carbonate, calcium hydroxide, and the like. Adjusting the pH of the phosphate-treated solution to a range of from about 6.5 to about 8.5 causes the formation of a precipitate and a pretreated cheese whey. The precipitate contains about 13 percent protein (dry solids basis), 46 percent lactose (dry solids basis), and 42 percent minerals (dry solids basis).

The precipitate can be separated from the pretreated cheese whey by means such as, centrifugal clarification, filtration, settling or the like. Preferably, the precipitate is separated from the pretreated cheese whey by centrifugal clarification. The solids concentration of the precipitate recovered by centrifugal clarification is about 140 grams per liter. The precipitate can be used as is, or concentrated and used in the concentrate form, or dried. It has been found that the precipitate can be used as a substitute for nonfat dry milk in food products, as for example in bakery products.

The pretreated cheese whey having a solids concentration between about 5.5 percent to about 6.5 percent can be further processed by molecular separation methods, as for example gel filtration, ultrafiltration, and/or reverse osmosis. Alternatively, the pretreated cheese whey feed can be concentrated, as for example by multistage vacuum evaporators, to yield a cheese whey concentrate which can be partially delactosed by lactose crystallization, the lactose separated, as for example by centrifugation, and the partially delactosed mother liquor further treated by molecular separation methods, as for example by gel filtration in accordance with U.S. Pat. No. Re. 27,806, ultrafiltration, or reverse osmosis.

The raw cheese whey can be pretreated at a temperature from about 7°C. to about 60°C. Most preferably, the temperature of the cheese whey treatment in the process of the present invention is from about 49°C. to about 55°C. in order to inhibit microbial growth.

The process of the present invention is further illustrated in the examples set forth below.

EXAMPLES 1-4

In Examples 1-3 the pH of 1-liter samples of raw cheddar cheese whey with an initial pH of 6.38 and a temperature of 52°C., were adjusted to a pH of 5.1 by the addition of phosphoric acid. Sodium tripolyphosphate was added to the three acidified cheddar cheese whey samples at various levels, to form a phosphate-treated solution. The solutions were stirred for less than 15 minutes at room temperature. Sodium hydroxide was added to the phosphate-treated solutions to adjust the pH of the samples to 7.0 to form a precipitate and a pretreated cheese whey. The precipitate was separated from the pretreated cheese whey by centrifugal clarification on an International Centrifuge (Model HN-S having a standard 6 tube (40 ml.) head) at a speed of 3,000 r.p.m. for 30 minutes.

The separated precipitate from Example 3 which was treated with 1.2 grams per liter sodium tripolyphosphate, exhibited the following typical chemical analysis: 12.8 percent Solids; 45.6 percent (dry matter basis) Lactose; 41.8 percent (dry matter basis) Minerals; 12.6 percent (dry matter basis) Protein (TKN, N × 6.38).

The solution clarity, as determined by percent transmittance, of the pretreated cheese whey feed was determined on a Bausch and Lomb Spectrophotometer, (Model Spectronic 20), at 560 millimicrons. The data for the samples are shown in Table I.

The pretreated cheese whey samples were then concentrated to a solids concentration of about 40 percent to 50 percent by flash evaporation on a Buchler flash evaporator at a water bath temperature of about 55°C. An aliquot of the concentrate was used to determine the fat concentration in accordance with Methods of Analysis - A.O.A.C., 194, (1965), 10th ed. and is presented in Table I.

The cheese whey concentrate samples were cooled to less than 10°C. for about 16 hours to determine the quantity of secondary sludge present in the samples. The secondary sludge formed on cooling was separated from the mother liquor by centrifugation as previously described. The volume of secondary sludge formed during the procedure was determined by recording the volume of secondary sludge sediment obtained from 40 milliliters of the cheese whey concentrate. The data obtained from this determination are presented in Table I.

Example 4 consisted of a control sample and was treated in the same manner as Examples 1–3 except that the sodium tripolyphosphate was not added. The solution clarity of the pretreated cheese whey was determined as previously described and is shown in Table I.

It is clear from the data presented in Table I relating to Examples 1–4 that the solution clarity of the pretreated cheese whey is substantially improved as compared to the control sample (Example No. 4). In addition, it is clear from Table I that the volume of secondary sludge in the pretreated cheese whey samples is substantially reduced when compared to the control sample (Example No. 4). Lastly, it is clear from the data in Table I that the fat concentration of the pretreated cheese whey is substantially reduced when compared to the control sample.

ondary sludge volume, and fat concentration were determined as previously described and are shown in Table I.

It is clear from Examples 5–8 in Table I that the pretreated cheese whey, treated by the alkali metal phosphate addition without adjusting the pH to the acid range, does not give a pretreated cheese whey having increased solution clarity. It is also clear from Table I that the volume of secondary sludge, and the fat concentration in the pretreated cheese whey samples of Examples 5–8 are not substantially reduced. It is therefore clear that the step of adjusting the pH of the cheese whey to within the range of about 5.5 to 4.0 is critical to provide the pretreated cheese whey of the present invention.

Examples 9–12 illustrate the process of the present invention wherein lactic acid is the pH adjusting agent.

EXAMPLES 9–12

In Examples 9–12, prepared from raw cheddar cheese whey obtained as described in Example 1, the

TABLE I

| Example No. | Example Description | | | | % Transmittance of Pretreated Cheese Whey Feed at 560 Millimicrons | Secondary Sludge in Concentrate (ml/40 ml) | Fat Concentration (% Dry Solids Basis) |
|---|---|---|---|---|---|---|---|
| | Acid to pH | Phosphate Concentration (TPP) grams per liter | Base to pH 7.0 | Precipitate Separation | | | |
| 1 | ($H_3PO_4$) 5.1 | 0.4 | NaOH | Clarified | 19.6 | 7 | 0.7 |
| 2 | do. | 0.8 | do. | do. | 77.5 | 1 | 0.2 |
| 3 | do. | 1.2 | do. | do. | 72.0 | 1 | 0.4 |
| 4 (control) | do. | — | do. | do. | 9.5 | 10 | 0.8 |
| 5 | — | 0.4 | do. | do. | 19.5 | 9 | 1.1 |
| 6 | — | 0.8 | do. | do. | 21.5 | 5 | 0.9 |
| 7 | — | 1.2 | do. | do. | 26.7 | 6 | 0.6 |
| 8 (control) | — | — | do. | do. | 20.8 | 6 | 0.8 |
| 9 | (lactic) 4.8 | 0.4 | do. | do. | 19.0 | 7 | 0.8 |
| 10 | do. | 0.8 | do. | do. | 83.0 | 1 | 0.5 |
| 11 | do. | 1.2 | do. | do. | 80.0 | 1 | 0.2 |
| 12 (control) | do. | — | do. | do. | 16.0 | 8 | 1.0 |

Examples 5–8 show the effect of adding the alkali metal phosphate, without adjusting the pH to within the acid range, on the clarity of the pretreated cheese whey feed, volume of secondary sludge, and fat concentration.

EXAMPLES 5–8

In Examples 5–7, samples of the raw cheddar cheese whey were treated as described in Examples 1–3 except that acid was not added to the cheese whey so that the native pH of 6.3 was maintained. Increasing levels of sodium tripolyphosphate were added to the samples to give phosphate-treated solutions. The phosphate-treated solutions were pH adjusted to 7.0 by the addition of sodium hydroxide. Any precipitate formed was separated from the pretreated cheese whey as described in Examples 1–3. The solution clarity of the pretreated cheese whey was determined as previously described and is shown in Table I. The volume of secondary sludge and fat concentration were determined as previously described and are presented in Table I.

Example 8 was the control sample and consisted of raw cheddar cheese whey treated as described for Examples 5–7 except that the sodium tripolyphosphate was not added to the samples. The solution clarity, secpH of one liter samples of raw cheddar cheese whey with an initial pH of 6.38 were adjusted to a pH of 4.8 by the addition of lactic acid. Sodium tripolyphosphate was added to the pH adjusted cheese whey samples corresponding to Examples 9, 10 and 11 to form a phosphate-treated solution. The solutions were stirred for less than about 15 minutes at room temperature. Sodium hydroxide was added to the phosphate-treated solutions to adjust the pH of the samples to 7.0 to form a precipitate and a pretreated cheese whey in accordance with the procedure described in Examples 1–4. The data obtained from these examples is shown in Table I.

Example 12 consisted of a control sample, which was treated in the same manner as Examples 9–11 except that the alkali metal phosphate, i.e., sodium tripolyphosphate, was not added. The solution clarity of the pretreated cheese whey was determined as previously described and is shown in Table I.

The volume of secondary sludge and the fat concentration in the samples were determined as previously described. The data obtained from these determinations are presented in Table I.

It is clear from Examples 9–12 from Table I that other acids, as for example, lactic acid, can be used in the process of the present invention to obtain the same effect, i.e., improved solution clarity in the pretreated cheese whey, reduced secondary sludge volume and fat concentration in the pretreated cheese whey samples when compared to the control sample.

EXAMPLES 13-20

In Examples 13-20 sodium tripolyphosphate was added to 1-liter samples of raw cheddar cheese whey obtained as described in Example 1 having a temperature of 125°-130°F. and a native pH of 6.15. The sodium tripolyphosphate was added at a concentration of 1.0 gram per liter. The pH of the 1-liter samples of cheddar cheese whey of Examples 13-19 was then adjusted by the addition of hydrochloric acid to the pH's indicated in Table II.

Example 20 consisted of a control sample treated as described in Examples 13-19 except that the pH was not adjusted by the addition of acid (hydrochloric acid). The pH of Examples 13-20 were adjusted by the addition of base, i.e., sodium hydroxide, to a pH from about 7.00 to 7.14 as indicated in Table II. Any precipitate formed upon neutralization was removed as previously described by clarification.

TABLE II

| Example No. | Phosphate Concentration (TPP) grams per liter | HCl to pH | NaOH to pH | Precipitate Separation | % Transmittance of Clarified Supernatant at 560 Millimicrons |
|---|---|---|---|---|---|
| 13 | 1.0 | 5.78 | 7.07 | Clarified | 18.0 |
| 14 | do. | 5.44 | 7.14 | do. | 24.2 |
| 15 | do. | 5.22 | 7.14 | do. | 41.3 |
| 16 | do. | 4.88 | 7.10 | do. | 67.2 |
| 17 | do. | 4.60 | 7.00 | do. | 76.3 |
| 18 | do. | 4.30 | 7.07 | do. | 77.1 |
| 19 | do. | 3.98 | 7.13 | do. | 74.3 |
| 20 (control) | do. | — | 7.08 | do. | 18.0 |

It is apparent from the data presented in Table II, Examples 13-20, that the addition of acid to effect a pH less than about 5.44 is critical in terms of providing a pretreated cheese whey exhibiting substantially improved solution clarity.

EXAMPLES 21-27

In Examples 21-27 separate batches of raw cheese whey were pH adjusted to about 4.5 with phosphoric acid, held for a period of 4 to 16 hours, pH adjusted to 7.0 with sodium hydroxide, clarified by means of a centrifugal clarifier, and concentrated to about 55 percent solids by vacuum evaporation at a temperature of about 150°F. The concentrate was cooled to about 70°F and lactose allowed to crystallize for about 8 hours. Crystallized lactose was separated from the mother liquor by centrifugation, to provide a separated mother liquor having a solids concentration of about 35 percent.

A 40 milliliter aliquot of the separated mother liquor was centrifuged at 3,200 r.p.m. for 20 minutes on a standard head of an International Centrifuge, Model No. HNS. The volume of sludge obtained from the 40 milliliter aliquot was determined visually and characterized as secondary sludge. The volumes of secondary sludge obtained from the different samples represented by Examples 21-27 are shown in Table III.

The separated mother liquor was contacted with molecular sieve material having a bed depth of about 8 cm in accordance with U.S. Pat. No. Re. 27,806. In accordance with the process of the patent the separated mother liquor was passed through the molecular sieve bed until the flow rate through the bed decreased to an unacceptable rate, indicating bed clogging. The bed of molecular sieve material was then washed in order to remove bed clogging components.

The time period from initial use of the bed of molecular sieve material and termination of use due to bed clogging is the running time. The running time varies due to the quantity of secondary sludge in the separated mother liquor. The relationship between the level of secondary sludge in the separated mother liquor and the running time is shown in Table III.

Continuous running times of greater than 8 hours have been found critical in terms of commercial applications. It is apparent from Table III that secondary sludge levels of less than 1 milliliter per 40 milliliters of separated mother liquor are required in order to obtain acceptable running times.

TABLE III

| Sample No. | Example Description | Secondary Sludge Level (milliliters/ 40 milliliters) | Run Time (hours) |
|---|---|---|---|
| 21 | 39.3% cheddar 12.8% Mozzarella 47.9% Cottage | 0.5 | 14 |
| 22 | 64.8% Cheddar 35.2% Cottage | 1.0 | 9 |
| 23 | 70.3% Cheddar 29.7% Cottage | 2.5 | 5.5 |
| 24 | 32.8% Cheddar 44.3% Mozzarella 22.9% Cottage | 3.0 | 3.0 |
| 25 | 70.4% Cheddar 29.6% CCW | 4.0 | 1.5 |
| 26 | 60.1% Cheddar 36.9% Cottage | 6.0 | 0.75 |
| 27 | 59.6% Cheddar 40.4% Cottage | 7.0 | 0.33 |

Variations may be made in proportions, procedures and materials without departing from the scope of this invention as defined in the following claims.

What is claimed is:

1. A process for pretreating a raw cheese whey comprising:
   a. forming a phosphate-treated solution of raw cheese whey by admixing raw cheese whey containing at least 70 percent (weight basis) sweet cheese whey with an alkali metal phosphate selected from the group consisting of potassium acid pyrophosphate, sodium acid pyrophosphate, potassium tripolyphosphate, sodium tripolyphosphate, tetrasodium pyrophosphate, tetrapotassium pyrophosphate, and mixtures thereof at a concentration from about 0.6 grams per liter to about 2.0 grams per liter at a pH from about 5.5 to about 4.0.

b. adjusting the pH of said phosphate-treated solution to a range of from about 6.5 to about 8.0 by the addition of a base to form a precipitate and a pretreated cheese whey and c. separating said precipitate from said pretreated cheese whey.

2. The process of claim 1 wherein said raw cheese whey is sweet cheese whey selected from the group consisting of cheddar cheese whey, Swiss cheese whey, mozzarella cheese whey, or mixtures thereof.

3. The process of claim 1 wherein said alkali metal phosphate is admixed at a concentration from about 0.8 grams per liter to about 1.2 grams per liter.

4. The process of claim 1 wherein said raw cheese whey is sweet cheese whey, and said alkali metal phosphate is selected from the group consisting of sodium tripolyphosphate, potassium tripolyphosphate, and mixtures thereof.

5. The process of claim 4 wherein said sweet cheese whey is cheddar cheese whey and said alkali metal phosphate is sodium tripolyphosphate.

6. The process of claim 5 wherein said alkali metal phosphate is admixed with said sweet cheese whey at a concentration from about 0.8 grams per liter to about 1.2 grams per liter.

* * * * *